E. J. PENNYPACKER.
SHUTTER MECHANISM FOR MOTION PICTURE CAMERAS.
APPLICATION FILED FEB. 19, 1917.
1,340,557.                                    Patented May 18, 1920.
2 SHEETS—SHEET 1.
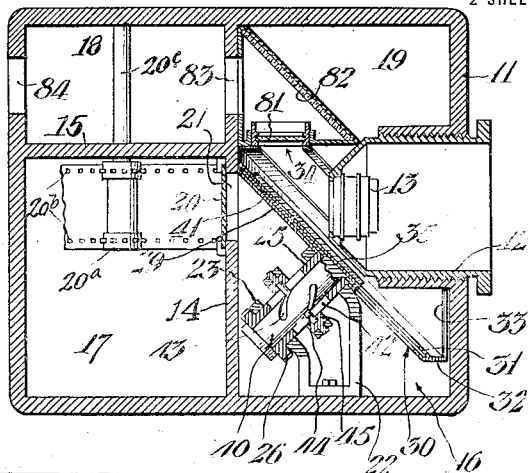
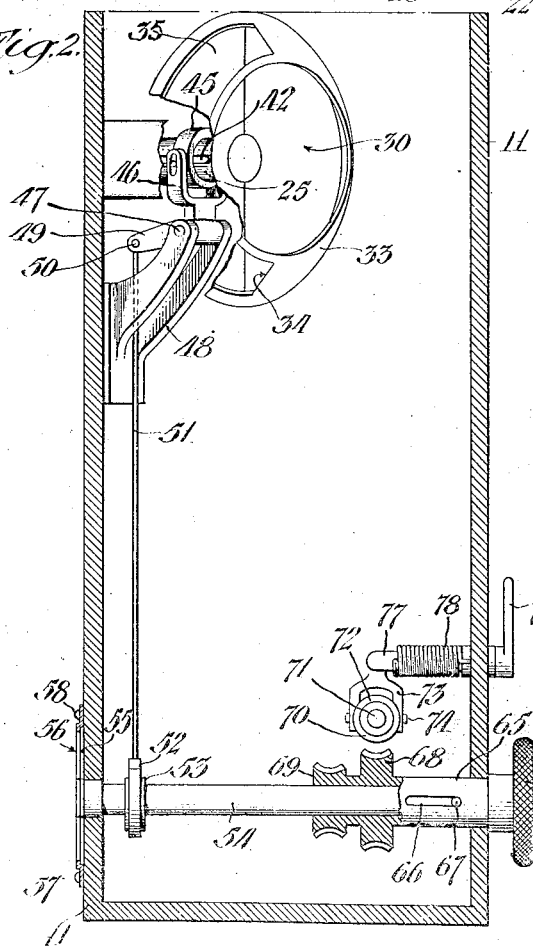
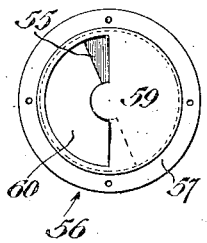
Inventor
Edward J. Pennypacker
by Graham & Davis
Attorneys E. J. PENNYPACKER.
SHUTTER MECHANISM FOR MOTION PICTURE CAMERAS.
APPLICATION FILED FEB. 19, 1917.

1,340,557.

Patented May 18, 1920.
2 SHEETS—SHEET 2.

Inventor
Edward J. Pennypacker
by Graham + Harris
Attorneys

UNITED STATES PATENT OFFICE.

EDWARD J. PENNYPACKER, OF LOS ANGELES, CALIFORNIA, ASSIGNOR TO MOTION PICTURE APPARATUS CO., INC., OF NEW YORK, N. Y., A CORPORATION OF NEW YORK.

SHUTTER MECHANISM FOR MOTION-PICTURE CAMERAS.

1,340,557.         Specification of Letters Patent.         Patented May 18, 1920.

Application filed February 19, 1917. Serial No. 149,702.

*To all whom it may concern:*

Be it known that I, EDWARD J. PENNYPACKER, a citizen of the United States, residing at Los Angeles, in the county of Los Angeles and State of California, have invented a new and useful Shutter Mechanism for Motion-Picture Cameras, of which the following is a specification.

My invention relates to motion picture cameras, and more particularly to the shutters used in such cameras.

The principal object of the invention is to provide a shutter for use in the motion picture camera which will be so constructed that the cameraman can see the image of the scene being taken during the entire time the film is being exposed.

A further object of the invention is to provide means in such a shutter for varying the time of exposure instantly, without interfering with the operation of the camera.

A further object of the invention is to provide in such motion picture camera a dissolving attachment by which the picture may be caused to fade way in a certain predecided upon length of film.

Referring to the drawings, which are for illustrative purposes only:

Figure 1 is a plan view, partly in section, of a portion of a motion picture camera embodying my invention.

Fig. 2 is a front elevation, partly in section, of the mechanism embodying my invention.

Fig. 3 is a side view of the dissolver indicator.

Figure 4:
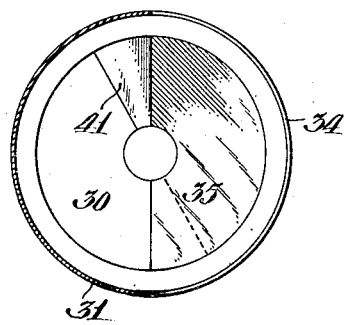
Fig. 4 is a front view of a shutter partly in section.
Figure 5:
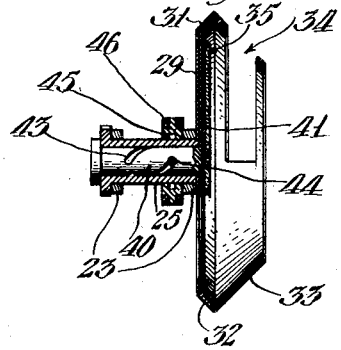
Fig. 5 is a side view of the shutter, partly in section.
Figure 6:
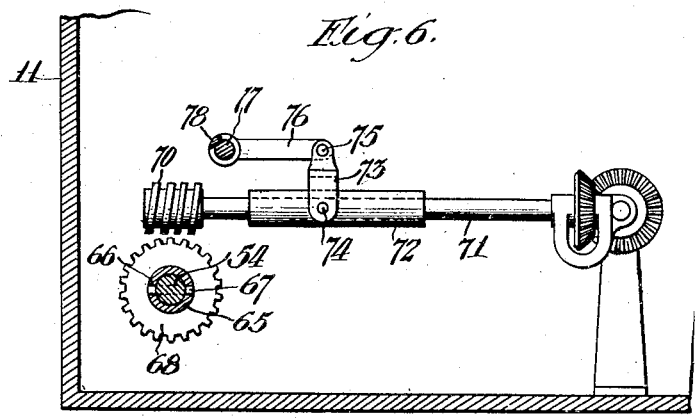
Fig. 6 is a side view of the dissolver mechanism.

In the illustrations, only those portions of a camera which relate directly to the present invention are shown. All other parts which are already common in the art are omitted for the sake of clearness.

In the embodiment of the invention shown, a camera box 11 is provided with a lens holder 12 in the front thereof, this lens holder carrying a lens system 13. Extending through the box at right angles to each other are two partitions 14 and 15, these partitions dividing the box into a shutter chamber 16, film chamber 17, an observing chamber 18, and a reflecting chamber 19. Located in the film chamber 17 is a motion picture film 20 which is moved intermittently past an aperture 21 by any of the standard intermittent motions now found in motion picture cameras.

The film feeding mechanism preferably includes a pair of sprocket wheels 20$^a$ (one shown in Fig. 1) adapted to coöperate with the marginal holes 20$^b$ of the film and draw the latter through the machine. The sprocket wheels 20$^a$ are adapted to be turned by the shafts 20$^c$ which may be driven from the operating handle in the usual or any preferred manner.

The lens 13 is so located that it focuses through the exposure aperture 21 on the film 20. Formed on a bracket 22, located in the shutter chamber 16, are bearings 23 in which a shutter quill 25 turns, this shutter quill being provided with a spur gear 26 at one end thereof which is driven by suitable gearing forming part of the camera mechanism not shown.

Secured to the quill 25 is a shutter mechanism. This shutter mechanism consists of a back 29 having nearly one-half of its area cut away to form an exposure opening 30 and carrying a circular frame 31, this frame being made up of two oppositely disposed truncated cones 32 and 33. The cone 33, hereinafter called the secondary shutter, is cut away, as shown in Fig. 2, through one-half of its diameter to form a mirror opening 34. Secured inside the frame 31 is a mirror 35, this mirror being semicircular in form and being solidly secured to the frame 31 on the same side as the mirror opening 34 and on the opposite side from the exposure opening 30. Secured to a shaft 40 turning inside the quill 25 is a dissolver plate 41, this dissolver plate being semicircular in form and turning inside the frame 31 between the back 29 and the mirror 35.

Formed in the quill 25 are a pair of straight slots 42, these slots being diametrically opposed to each other. Formed in the shaft 40 is an inclined slot 43, and passing through the slots 42 and 43 is a pin 44, this pin being secured in a sliding collar 45 which may move axially along the outer surface of the quill 25 between the bearings 23. A forked bell-crank 46 is pivoted on a pin 47 carried in a bracket 48, this bell-crank extending up and engaging the collar 45 which turns freely inside the forks of the bell-crank 46. An extension 49 on the bell-crank 46 carries a pin 50 to which the upper end of an operating rod 51 is secured. The operating rod 51 is secured at its lower end to an eccentric strap 52 which surrounds an eccentric 53 which is fixed to a dissolver shaft 54. The shaft 54 is free to turn in suitable bearings formed in the walls of the box 11 and is connected at one end to a dissolver indicator plate 55 of a dissolver indicator 56. This dissolver indicator 56 consists of a fixed plate 57 which is secured by means of screws 58 to the side of the camera 11 and which has a stationary semicircular plate 59 formed therein. The plate 57 is cut away, as shown at 60, to form a semicircular opening. The plate 55 turns behind the plate 59 and may be thrown into the opening 60, as shown in Fig. 3, a greater or lesser amount to indicate the amount of shutter opening as will hereinafter be explained. Sliding on the shaft 54 is a quill 65, this quill being compelled to turn with the shaft 54 by reason of a slot 66 formed therein into which a pin 67 secured to the shaft 54 is free to slide.

Secured to the quill 65 are a pair of worm gears 68 and 69 which are of suitable pitch to be engaged by a worm 70 driven by a worm shaft 71 attached to the mechanism of the camera, not shown.

A loose collar 72 supports the worm shaft 71, this collar being carried on a clevis 73 by means of pins 74. The clevis 73 is supported on a pin 75 carried on an arm 76 secured to a dissolving lever shaft 77, which has a spiral spring 78 tending to hold the worm 72 in its upper position, as shown in full lines in Fig. 2. A dissolver operating lever 79, secured to the shaft 77 is provided by means of which the cameraman can throw the worms 72 into engagement with either of the gears 68 or 69, depending upon which gear is in position to be engaged. A speed shifting handle 80 is secured to the outer end of the quill 65, and by means of this handle the quill 65 can be shifted axially on the shaft 54 so as to move either the gear 68 or gear 69 in the proper position to be engaged by the worms 72. The shaft 54 can also be turned readily by the handle 80, this turning being utilized to manually vary the proportion of time of exposure, as will hereinafter be explained.

Located in a secondary field opening in a partition at right angles to the partition 14, located between the reflecting chamber 19 and the shutter chamber 16, is a ground glass plate 81 which forms a portion of one of the walls of the reflecting chamber 19. Located in the reflecting chamber 19 is a stationary mirror 82, and formed in the partition 14, between the reflecting chamber 19 and the observing chamber 18 is an observation window 83, this observation window 83 being in straight line with the sight opening 84 at the back of the camera.

The method of operation is as follows:

Power being supplied by the camera mechanism, not shown, the gear 26 and the quill 25 is turned, this quill also turning the shaft 40 and the various members secured thereto. When the shutter mechanism is in motion, the light gathered and focussed by the lens 13 is alternately thrown on the film 20 and on the ground glass plate 81. It is thrown on the film directly through the exposure opening 30 and it is reflected on the plate 81 by the mirror 35. The back of the glass plate 81 may be seen in the mirror 82 through the windows 83 and 84. The image on the plate 81 is an exact duplicate of the image formed on the film 20, and while it is intermittent, this intermittency, due to the persistency of vision, does not appear to the observer. The secondary shutter 33 is of such a size and is so located that it entirely shuts off any light that might enter the shutter chamber 16 from the reflecting chamber 19 while the film is being exposed.

For the purpose of varying the time of exposure and for the purpose of providing for either hand or automatic fade-out, the plate 41 is provided. The amount of exposure depends on the size of the exposure opening 30 which depends on the position of the plate 41. This is regulated by the position of the collar 45 on the quill 25, due to the fact that the slot 42 is straight and the slot 43 is inclined. The collar turns with the quill 25 inside the forks of the bell-crank 46, and as the bell-crank swings around the pin 47 the axial position of the collar 45 is varied. If we consider the quill 25 as stationary, it is evident that an axial movement of the collar 45 will turn the shaft 40 due to the inclination of the slot 43, this turning of the shaft 40 inside the quill 25 turning the plate 41 with relation to the mirror 35, and the remainder of the shutter, so as to partially or wholly close the exposure opening 30. It is, however, not necessary for the quill 25 to be stationary to cause the plate 41 to close the exposure opening 30, but its closure can take place when the shutter is revolving, this being accomplished by an upward or downward movement of the rod 51 to a sufficient degree to either wholly or partially open or close the exposure opening 30. The movement of the rod 51 is caused by rotation of the shaft 54, this rotation moving the rod 51 up or down due to the movement of the eccentric 53 inside the eccentric strap 52. The parts are so arranged and related that the plate 41 and the plate 55 move together, and at the same angular rate, so that the operator can tell at a glance the exact area of exposure opening 30 covered by the plate 55 by observing the area of the opening 60 covered by the plate 55.

The necessary movement of the shaft 54 to vary the exposure may be caused at any time by turning the handle 80, or it may be accomplished automatically by depressing the operating lever 79 and throwing the worm 72 into engagement with either of the gears 68 or 69. The shaft 71 is driven at such a speed, and the proportion of the gears 68 and 69 are such that the exposure opening 30 will then be wholly cut off in a certain definite number of feet of film movement after the operating lever 79 is depressed. It will be seen that the camera man by means of the mirror 35 is given an uninterrupted and constant view of the scene which he is taking during the entire time that the film is being exposed. It is also evident that the proportion of exposure time can be manually regulated at all times by means of the handle 80, and that it can be automatically regulated to dissolve in a certain number of feet by means of the operating lever 79 through the gears 68 and 69.

In the following claim, the film 20 is referred to as a primary optical field, and the ground glass plate 81 as a secondary optical field. Under certain conditions the positions of the film and plate may be reversed.

I claim as my invention:—

In a motion picture camera; walls forming a shutter chamber having a film exposure opening formed in one wall and an observation window formed in another wall, said walls forming a dihedral angle of approximately 90 degrees; a lens system arranged to focus through said film opening; a primary shutter continuously rotatable in a plane at an angle of 45° with the axis of said lens system between the latter and said film exposure opening, comprising two parallel circular disks, provided with coincident semicircular openings therein, a semicircular reflecting surface secured to one of said disks and adapted while rotating to reflect light from said lens system through said window, light when not so reflected being adapted to pass through said semicircular openings in the primary shutter to said film exposure opening, a segmental disk mounted between said circular disks and movable relative thereto for varying the size of the opening while the shutter is rotating a frusto-conical secondary shutter, secured to and rotatable with the circular disks of said primary shutter, for closing said window while light is being admitted through the primary shutter to said film exposure opening and means for continuously and synchronously rotating said shutters and the reflecting surface to alternately expose the window and said opening at regular intervals.

In testimony whereof I have hereunto set my hand at Los Angeles, California, this 13th day of February, 1917.

EDWARD J. PENNYPACKER.